(12) United States Patent
Raccosta

(10) Patent No.: US 8,635,759 B2
(45) Date of Patent: Jan. 28, 2014

(54) METHOD AND MACHINE FOR CLAMPING PLATES ON FABRIC AND LEATHER PIECES

(76) Inventor: Gaetano Raccosta, Merate (IT)

( * ) Notice: Subject to any disclaimer, the term of this patent is extended or adjusted under 35 U.S.C. 154(b) by 571 days.

(21) Appl. No.: 12/803,983

(22) Filed: Jul. 12, 2010

(65) Prior Publication Data

US 2011/0010918 A1    Jan. 20, 2011

(30) Foreign Application Priority Data

Jul. 14, 2009 (IT) .............................. MI2009A1247

(51) Int. Cl.
*B23Q 7/00* (2006.01)

(52) U.S. Cl.
USPC ......... 29/525.08; 29/524.1; 29/505; 227/151; 227/154; 403/281; 403/283; 24/13

(58) Field of Classification Search
USPC ..................... 29/432.1, 559, 524.1, 505, 462, 29/464–466, 720, 709, 437, 525.06; 24/13; 227/151, 154, DIG. 902; 403/274, 279, 281–283; 493/379, 383, 493/384

See application file for complete search history.

(56) References Cited

U.S. PATENT DOCUMENTS

| | | | | |
|---|---|---|---|---|
| 3,750,925 A | * | 8/1973 | Schmidt et al. | 227/116 |
| 3,815,805 A | * | 6/1974 | Beneteau | 227/119 |
| 3,964,661 A | * | 6/1976 | Schmidt et al. | 227/18 |
| 3,987,950 A | * | 10/1976 | Schmidt et al. | 227/116 |
| 3,992,765 A | * | 11/1976 | Silverbush et al. | 29/716 |
| 4,007,537 A | * | 2/1977 | Silverbush et al. | 29/432.1 |
| 4,703,882 A | * | 11/1987 | Herten | 227/8 |
| 4,869,183 A | * | 9/1989 | Moore, III | 112/103 |
| 5,476,204 A | * | 12/1995 | Eisenpresser et al. | 227/18 |
| 5,774,364 A | * | 6/1998 | Kamps | 700/117 |
| 5,781,989 A | * | 7/1998 | Schmidt | 29/787 |
| 7,096,614 B1 | * | 8/2006 | Williams | 40/1.5 |
| 7,325,339 B2 | * | 2/2008 | Jordan | 40/1.5 |

* cited by examiner

*Primary Examiner* — David Bryant
*Assistant Examiner* — Bayan Salone
(74) *Attorney, Agent, or Firm* — Hedman & Costigan, P.C.; James V. Costigan; Kathleen A. Costigan

(57) ABSTRACT

A method for clamping a plate on a sheet or fabric material support, comprises the step of providing a plate and a counter-plate, the plate comprising a plurality of oin supporting elements bearing, on a non exposed to the view rear side thereof a plurality of pins for engagement each in a corresponding hole of the counter-plate, characterized in that method further comprises the step of providing a pre-plate including a plurality of temporary attachment points on non exposed to the view parts of said elements.

6 Claims, 9 Drawing Sheets

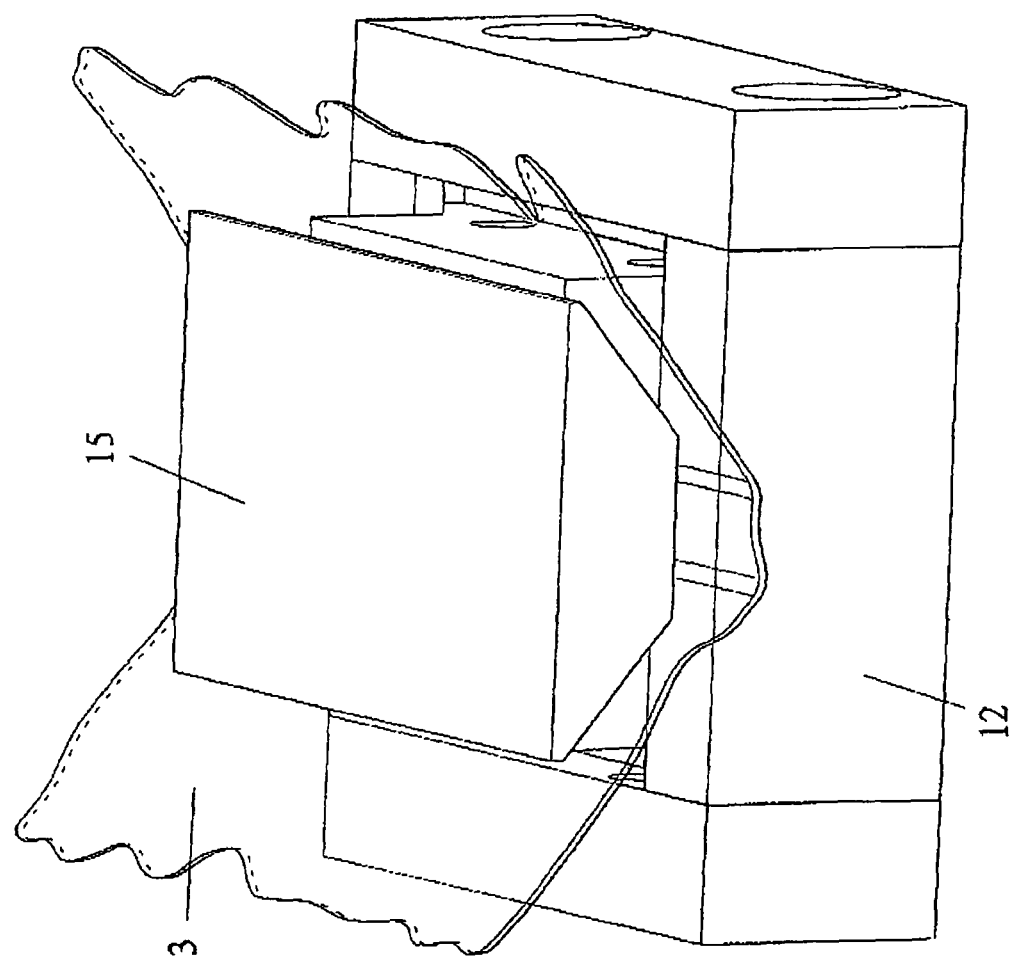

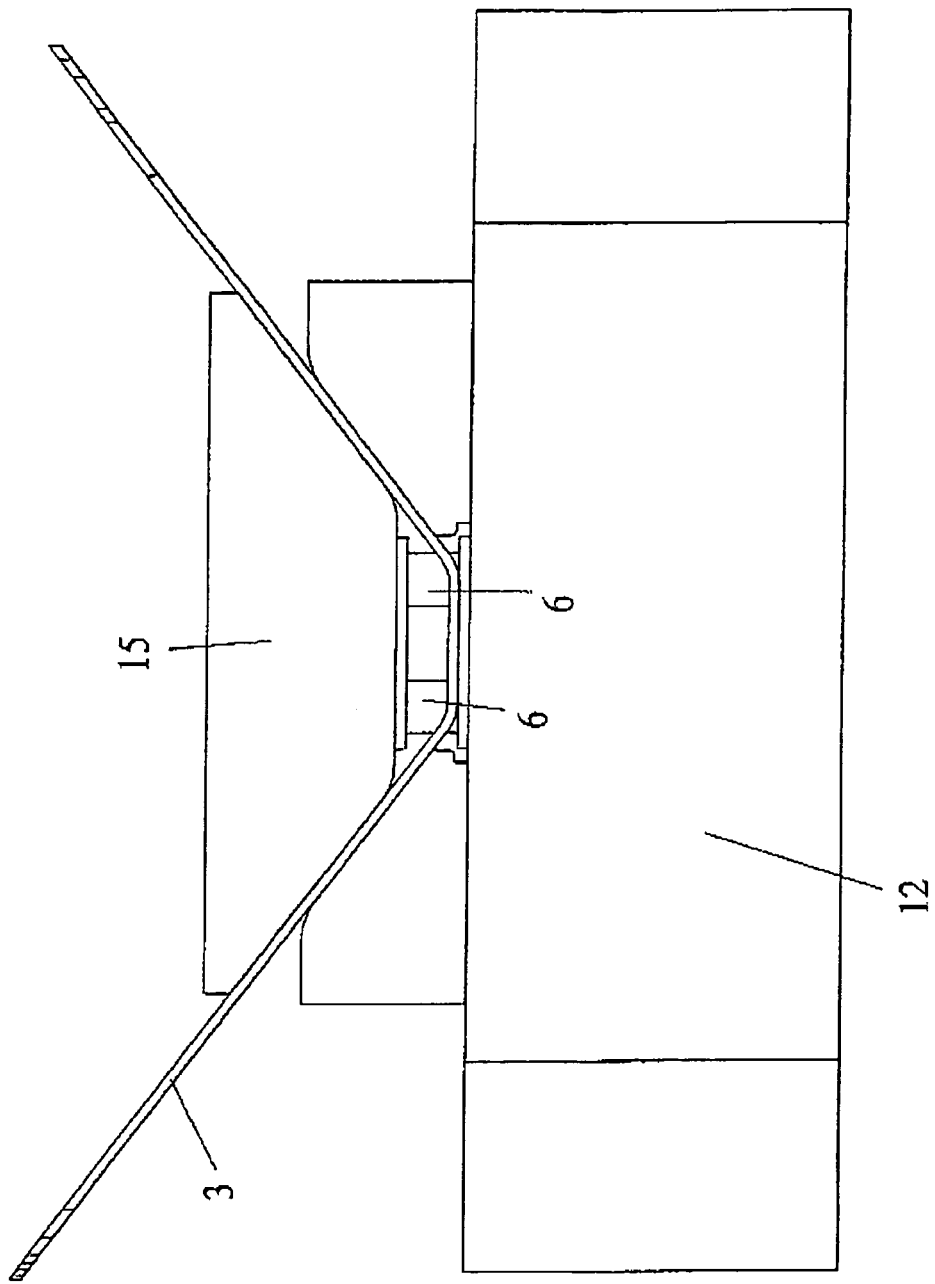

METHOD AND MACHINE FOR CLAMPING PLATES ON FABRIC AND LEATHER PIECES

BACKGROUND OF THE INVENTION

The present invention relates to a method and machine or apparatus for clamping plates or tags on fabric and leather pieces.

The field of the invention is that of those plates, usually made of a metal material, which, for ornamental purposes, are clamped or fixed on an exposed to the view surface of a sheet material, such as fabric, leather and the like materials for making garments, leather goods, and other fittings in the fashion and the like industry.

More specifically, the plates or tags the invention is related to comprise a set of letters of other objects and signs having different geometrical configurations or patterns, and made of a metal material, such as a zinc, aluminium and magnesium alloy, so-called "ZAMA", and clamped to the fabric material.

An example of the above plates or tags comprises a plurality of letters or other geometrical patterns, so assembled as to form a single rigid body.

Said prior plates have the advantage of preserving their original geometrical pattern, but the drawback of exposing to the view the bar or frame elements holding the plate parts, such as said letters, joined with one another for providing a single rigid plate body.

To overcome this drawback, it is also known to use temporary plates, the so-called "pre-plates", including coupling means for coupling the plate parts, which coupling means, however, must be removed after having clamped the plates to a desired sheet or fabric piece, said pre-plates also including an outer support element, in the form of a frame, to which the outer edge portions of the letters are temporarily anchored.

This frame support, in turn, has the drawback that, after having removed the letters therefrom, a portion of the fabric surface, usually damaged by the frame removal process, together with the letter damaged parts remain exposed to the view.

Moreover, metal letters tend to release, because of the chemical agents used for washing or processing leather and fabric materials, substances which may stain or alter the original aesthetic aspect of the plate coupled fabric.

SUMMARY OF THE INVENTION

Accordingly, the aim of the present invention is to provide a method and machine for clamping plates or tags without means for coupling the individual plate forming components and not damaging the sheet materials said plates are applied to.

According to one aspect of the present invention, the above aim, as well as yet other objects, which will become more apparent hereinafter, are achieved by a method and machine for clamping plates or tags on fabric and leather pieces according to the accompanying claims.

With respect to the prior art, the invention provides the advantages that the inventive plate comprises letters and the like, which are detached from one another, and does not exhibit damaged parts.

BRIEF DESCRIPTION OF THE DRAWINGS

Further characteristics and advantages of the present invention will become more apparent hereinafter from the following detailed disclosure of a preferred embodiment thereof, which is illustrated, by way of an indicative, but not limitative, example in the accompanying drawings, where:

FIGS. 8 and 9 show further method steps for assembling the inventive plates to a fabric material.

DESCRIPTION OF THE PREFERRED EMBODIMENTS

Figure 1:
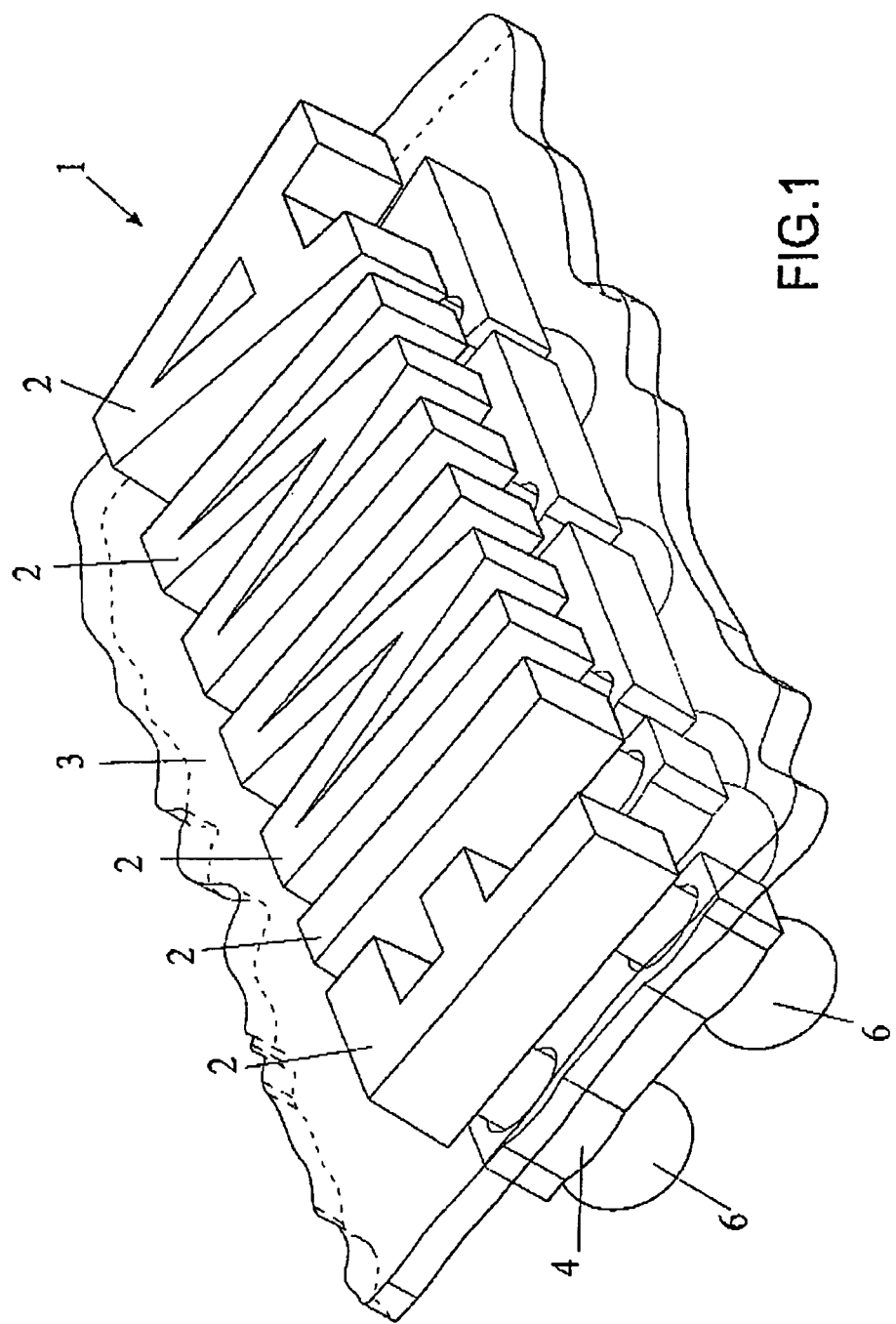
FIG. 1 shows an embodiment of an inventive plate applied on a fabric material support.

With reference to FIG. 1, the reference number 1 shows the inventive plate, comprising a plurality of letters 2 and clamped to a fabric material 3 through a counter-plate 4.

Figure 3:
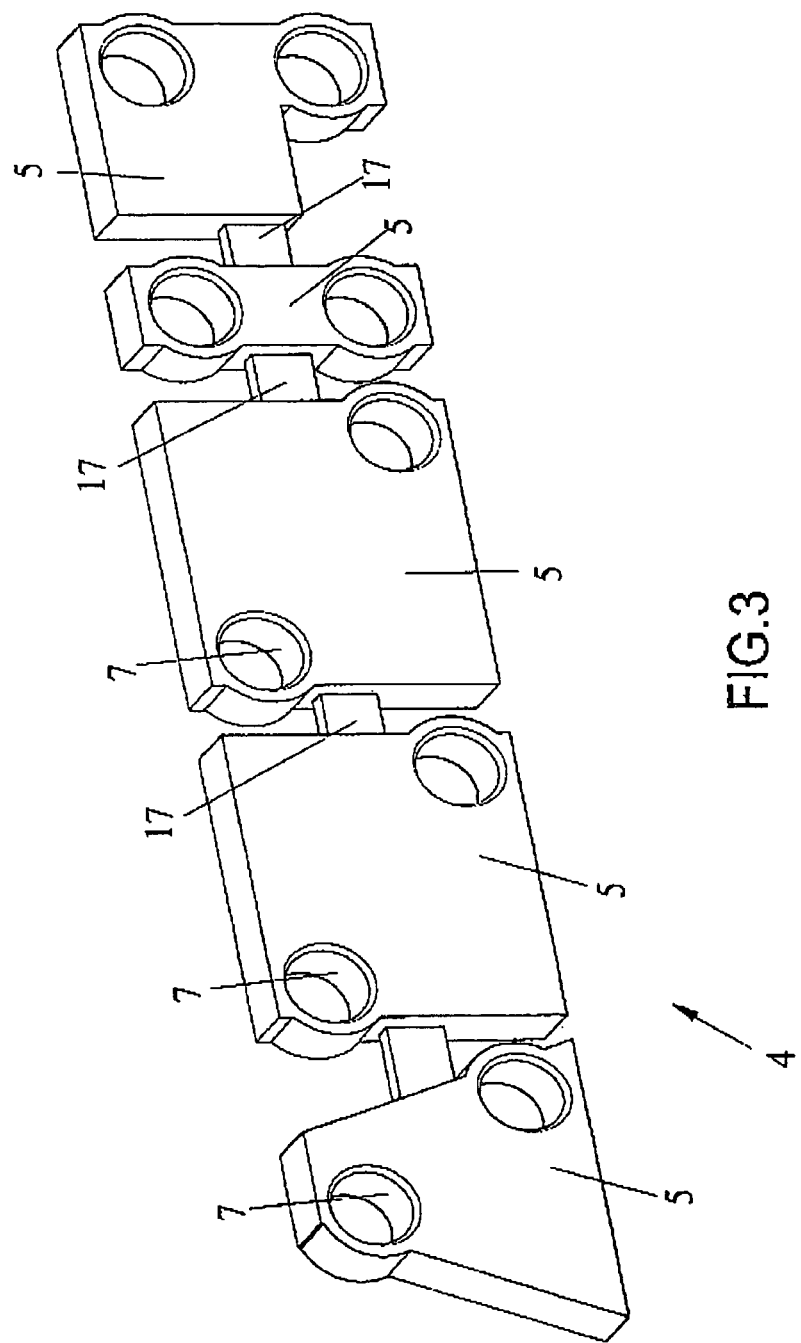
FIG. 3 shows a counter-plate used for clamping to a fabric the plate shown in FIG. 1.

The letters 2 of the plate 1 and corresponding elements 5 of the counter-plate 4 (FIG. 3) are all preferably made of a metal or any other suitable material.

As shown, the letters 2 of the plate 1 comprise, on their rear face, that is the face thereof not exposed to the view in an assembled condition of the plate, a plurality of pins 6, for engaging in corresponding holes 7 of the elements 5 of the counter-plate 4 (FIG. 3) to be riveted on the latter.

Figure 2:
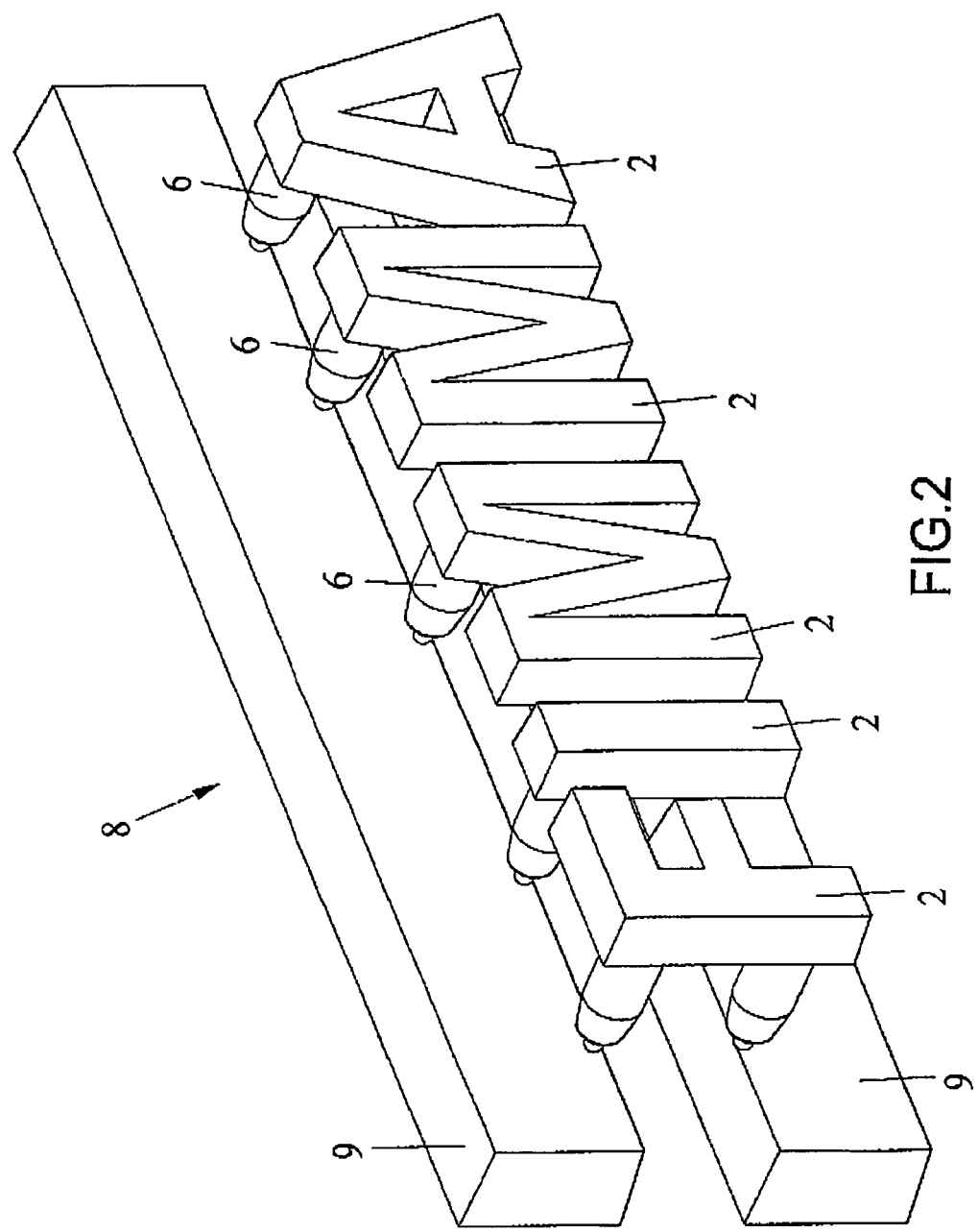
FIG. 2 shows a pre-plate therefrom the plate of FIG. 1 has been obtained.

The inventive pre-plate, generally indicated by the reference number 8 in FIG. 2, comprises said plate letters 2 and a plurality of rods or bars 9 thereon the free end portions of said pins 6 are integrally removably formed.

Figure 4:
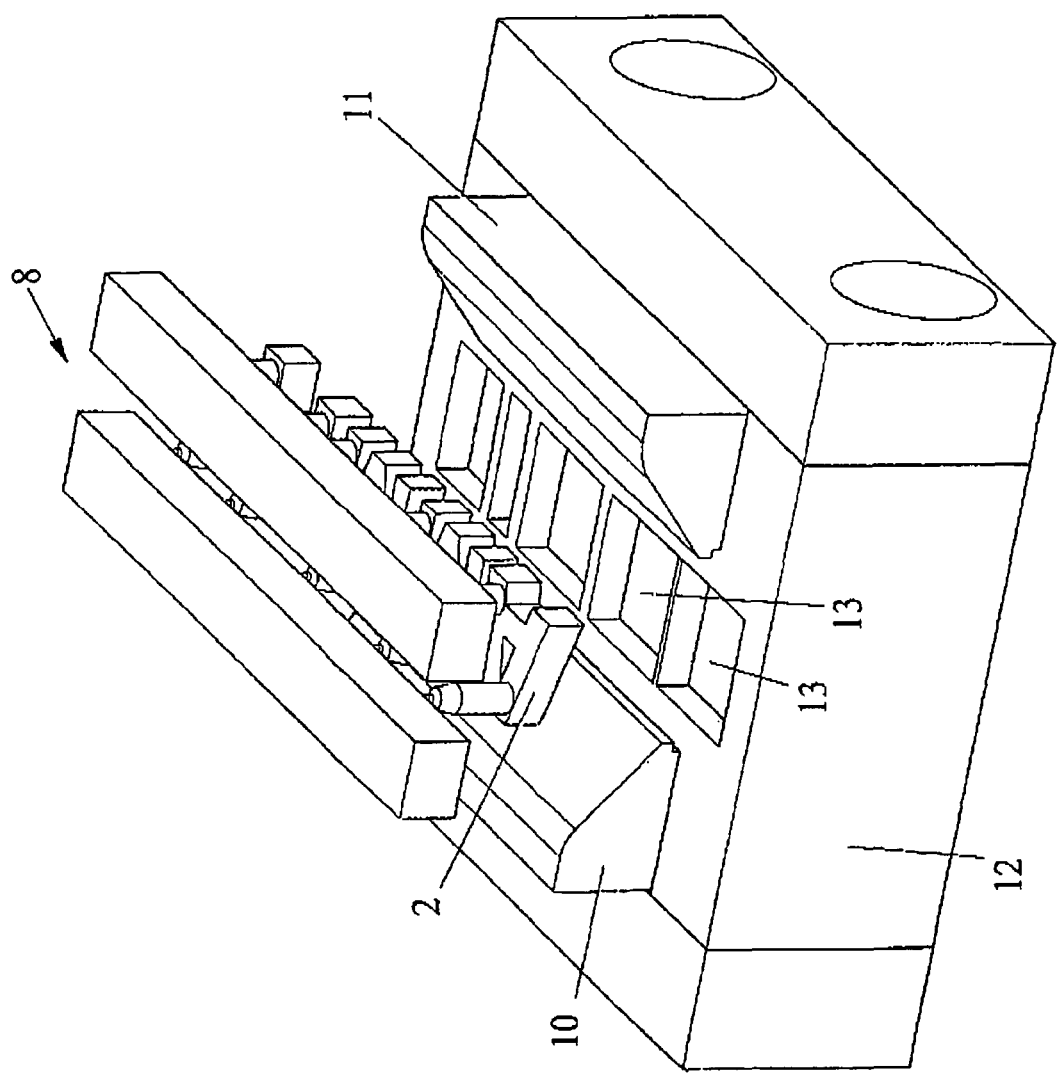
FIGS. 4 to 6 show different steps of a method according to the present invention for assembling a plate or tag to a fabric material.
Figure 5:
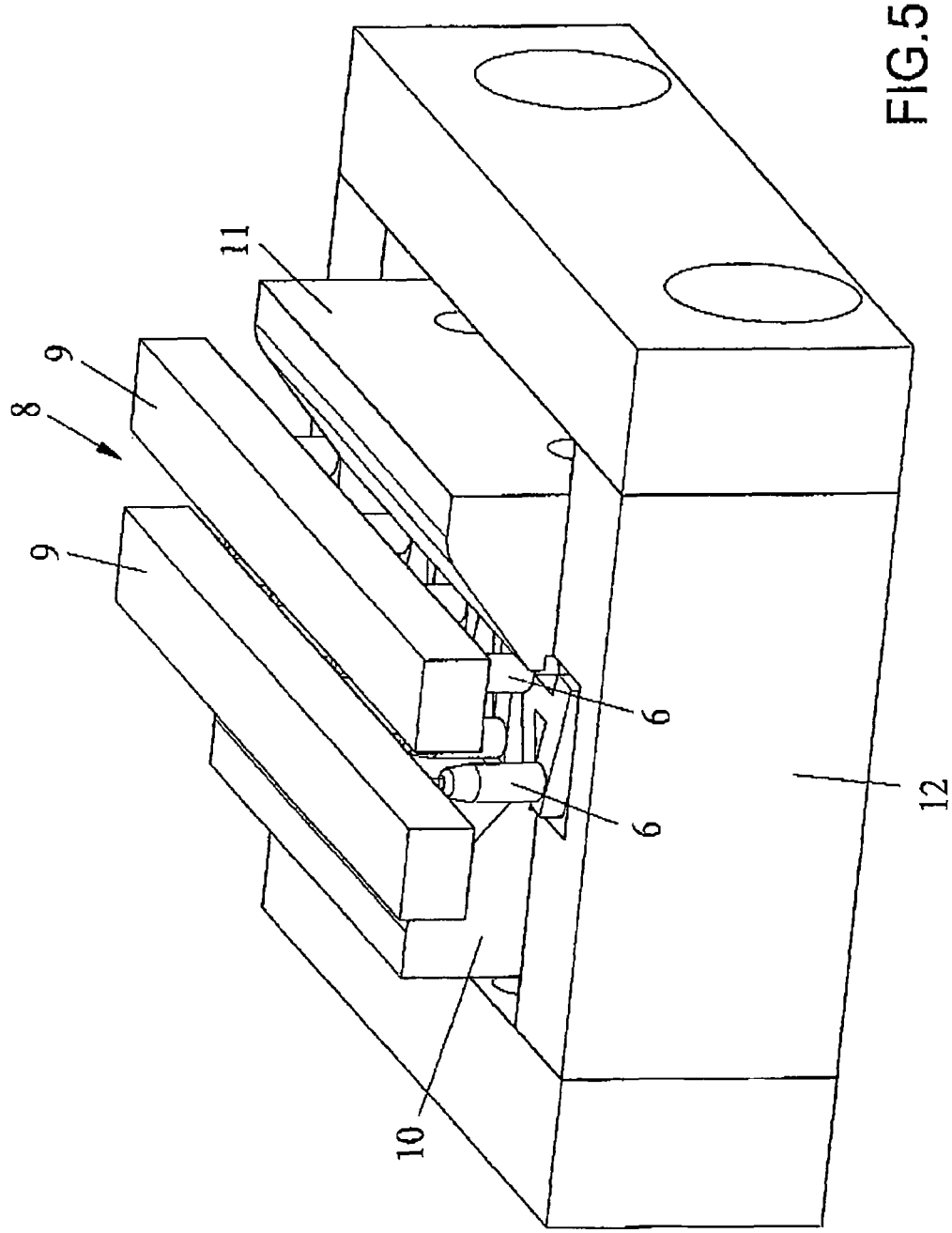
Figure 6:
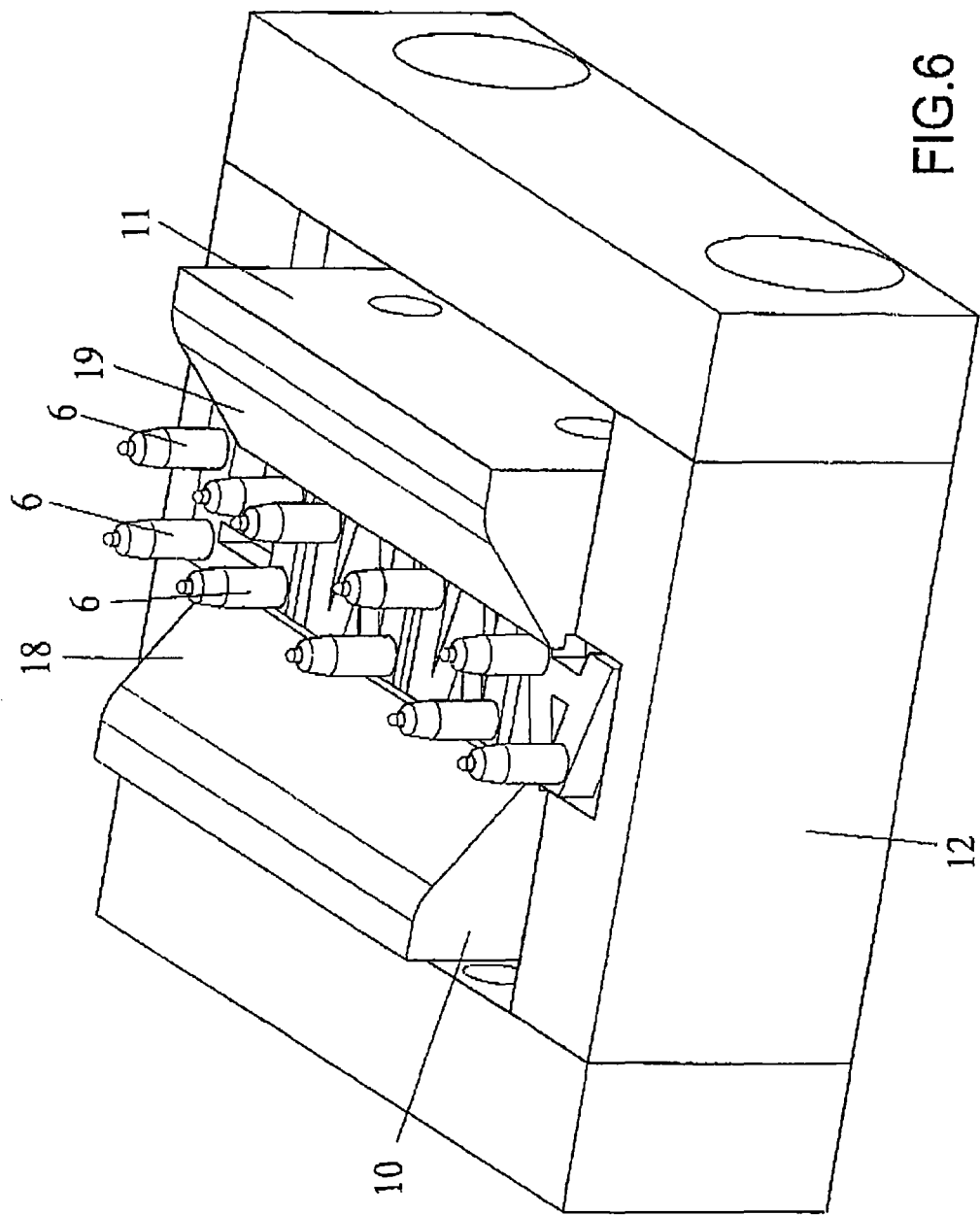

FIGS. 4 to 6 show a method step for preparing the plate 1 to be assembled to the fabric material 3. In this step, the pre-plate 8 is held, at its letters 2, at the level of opposite jaws 10 and 11 of a punch 12 suitable for applying the plate 1, said jaws 10, 11 being driven from a first moved away position (FIG. 4) for engaging said letters 2 in corresponding seats 13 formed in the body of the punch 12, to a second position for holding the pre-plate 8 at the level of said pins 6 (FIG. 5).

Figure 7:
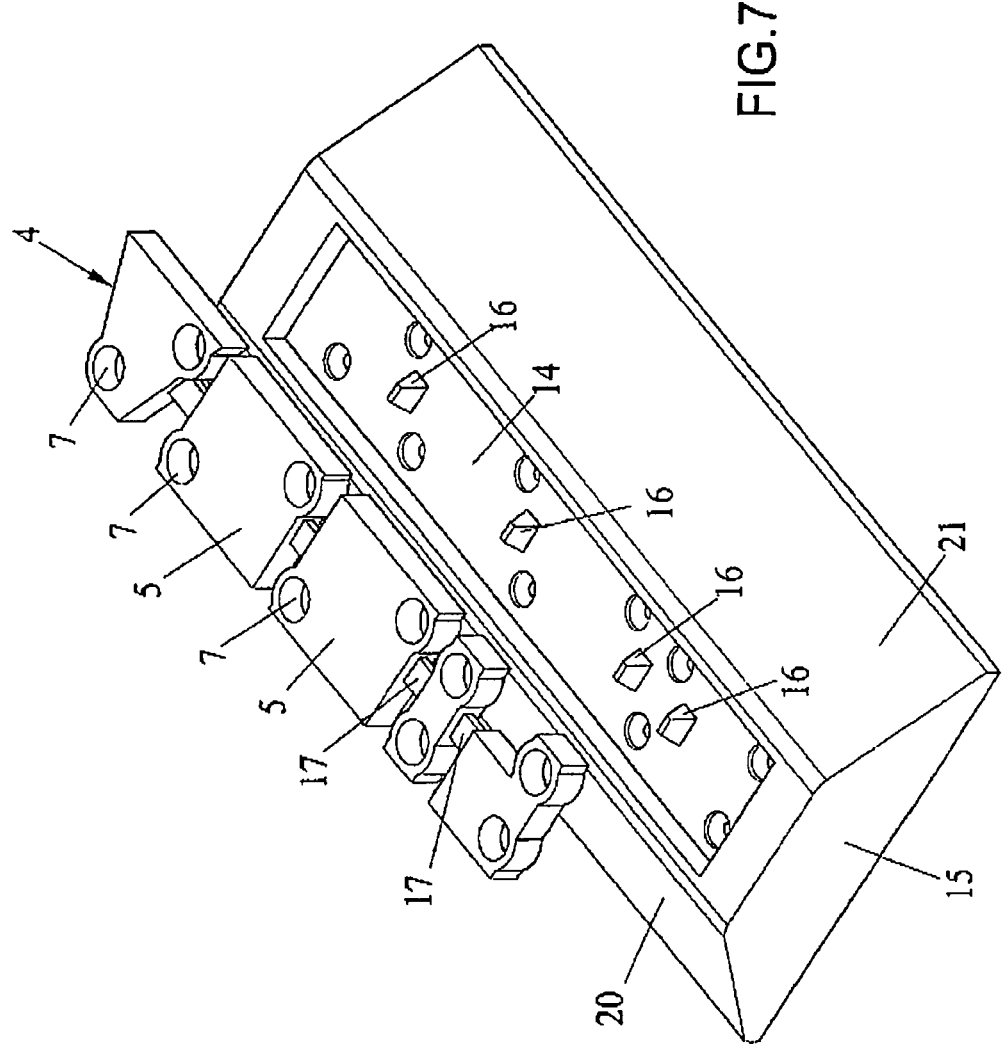
FIG. 7 shows a further method step for assembling a counter-plate to a plate.

With the pre-plate 8 clamped to the punch 12, the rod elements 9 of FIG. 5 are manually removed from the pins 6, thereby allowing the elements 5 of the counter-plate 4 to be engaged in their respective holes 7, the counter-plate 4 being in turn engaged in a respective seat 14 of a corresponding counter-punch 15 (FIGS. 6 and 7).

Starting from the spaced position of the punch 12, including the plate of FIG. 6, and of the counter-punch 15, including the counter-plate of FIG. 7, the fabric material 3 to which the plate 1 must be clamped is arranged therebetween.

The clamping operation is performed by moving the punch 12 and counter-punch 15 toward one another, to cause at first the plate pin 6 to pass through the fabric material 3, and then by engaging said pins 6 in the holes 7 of the counter-plate 4, while simultaneously riveting the end portions of said pins in said holes, and then by moving the jaws 10 and 11 away from one another to release the plate 1 in a condition properly clamped to the fabric material 3, as shown in FIG. 1.

Advantageously, the counter-punch 15 comprises a plurality of wedge projections 16 designed for breaking tongue elements 17 coupling the elements 5 of the counter-plate 4, with the punch element 12 and counter-punch element 15 in a "closed" condition thereof.

Said the jaws 10 and 11 are advantageously moved away from one another cooperating inclined surfaces 18 and 19 of said jaws and corresponding inclined surfaces 20 and 21 of the counter-punch 15, operating against counter-biasing return elastic means, not shown.

It should be apparent that, instead of the rod elements 9 it would be also possible to use other equivalent means, provided that the letters 2 are anchored or clamped at the level of their not exposed to the view parts, in particular at said pins 6.

Thus, after having detached the rod elements 9, possibly damaged parts will be arranged on the not exposed to the view side of the plate, together with polluting substances released thereby.

According to a modified embodiment, the rod elements 10 and 11 could also be clamped on the side surface of the pins, and could have any desired configuration depending on the pattern and arrangement of the elements 2.

The invention claimed is:

1. A method for clamping a plate (1) on a sheet material support (3), said method comprising the steps of providing a pre-plate (8) and a counter-plate (4), said pre-plate (8) comprising a plurality of pin supporting elements (2) bearing, on the rear side thereof, a plurality of pins (6) for engagement each in a corresponding hole (7) of said counter-plate (4); wherein said pre-plate (8) includes a plurality of anchoring means (9) for temporarily anchoring said pin supporting elements (2) of said pre-plate (8) at a plurality of attachment points, the attachment points amongst said anchoring means (9) and supporting elements (2) being arranged on the rear side of said elements (2), said anchoring means (9) being further adapted to be removed from said pre-plate to allow said pins (6) to be exposed and configured to be inserted into said holes (7) of the counter-plate (4); removing said anchoring means (9) from said pre-plate, to expose said pins (6); clamping said plate (1) on said sheet material support (3) by engaging said pins (6) in said holes (7) of said counter-plate (4); wherein said sheet material support (3) is interposed between said plate (1) and said counter-plate (4).

2. The method of claim 1, wherein said anchoring means (9) are arranged at said pins (6).

3. The method of claim 2, wherein said method further comprises: temporarily locking said pre-plate (8) between jaws (10,11) of a punch element (12), disengaging said anchoring means (9) from said pin supporting elements (2), thereby exposing said pins (6); engaging said pins (6) in said holes (7) of said counter-plate (4); wherein said sheet material support (3) is interposed there-between; thereby clamping said plate (1) on said sheet material support (3).

4. A pre-plate (8) for applying at least a plate (1) on a sheet material support (3), especially by a method according to claim 3, said pre-plate (8) comprising a plurality of pin supporting elements (2) bearing, on the rear side thereof, a plurality of pins (6) and anchoring means (9) for temporarily anchoring said pin supporting elements (2) of said pre-plate (8) at attachment points, wherein the attachment points between said anchoring means (9) and said pin supporting elements (2) are arranged on the rear side of said pin supporting elements (2).

5. A pre-plate (8) according to claim 4, wherein said anchoring means (9) comprise a plurality of rod elements (9) coupled to said pin supporting elements (2) by said pins (6).

6. A plate (1) including a plurality of pin supporting elements (2) which are detached from one another and bearing, on the rear side thereof, a plurality of pins (6), a plurality of elements (5) comprising a plurality of holes (7) adapted to cooperate with said pins (6) of said pin supporting elements (2), each pin (6) being configured to be engaged in a corresponding hole (7) of said elements (5); wherein said plate (1) is clamped on a sheet material support (3) when said pins (6) are engaged with said holes (7) of said elements (5), wherein said pin supporting elements (2) comprise a plurality of disengaged temporary attachment points, the disengaged temporary attachment points being arranged on the rear side of said pin supporting elements (2).

\* \* \* \* \*